United States Patent Office 2,872,477
Patented Feb. 3, 1959

2,872,477

α-(DIALKYLAMINO)-6-PHENYL-O-CRESOL ESTERS

Raymond H. Rigterink, Midland, Mich., assignor to The Dow Chemical Company, Midland, Mich., a corporation of Delaware No Drawing. Application April 5, 1957
Serial No. 650,853

6 Claims. (Cl. 260—476)

The present invention relates to α-(dialkylamino)-6-phenyl-o-cresol esters and to the mineral acid addition salts thereof.

The esters of this invention have the following formula

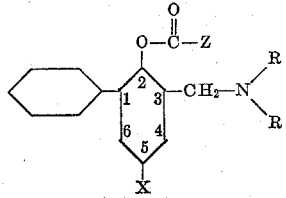

In this and succeeding formulae, each R represents lower-alkyl, Z represents lower alkyl, lower alkenyl or phenyl, and X represents hydrogen or chlorine. The terms lower alkyl and lower alkenyl as employed in the present specification and claims refer to the alkyl and alkenyl radicals containing not to exceed 4 carbon atoms. The esters are oily liquids and the mineral acid addition salts of the esters are crystalline solids which are somewhat soluble in many organic solvents and of very low solubility in water. They are active as plant growth control materials and are adapted to be employed in dust and spray compositions for the control of the growth and the kiling of weeds and for the sterilization of soil with regard to the growth of plants.

The new hydrobromide and hydrochloride salts of the new esters may be prepared by condensing an organic acyl halide having the formula

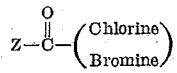

with an α-(dialkylamino)-6-phenyl-o-cresol compound having the formula

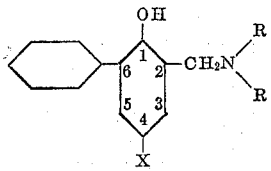

to produce an ester of the α-(dialkylamino)-6-phenyl-o-cresol compound and hydrogen halide of reaction. The hydrogen halide appears in the reaction mixture as the hydrogen halide salt of the α-(dialkylamino)-6-phenyl-o-cresol esters. The reaction is carried out in an inert organic solvent. Good results are obtained when employing substantially equimolecular proportions of the reactants. The reaction is somewhat exothermic and takes place smoothly at temperatures from 0° to 100° C. The temperature conveniently may be controlled by regulating the rate of contacting the reactants and/or by external cooling.

In carrying out the reaction, the acyl chloride or bromide, and α-(dialkylamino)-6-phenyl-o-cresol compound are mixed together one with the other, and in an inert organic solvent such as toluene or benzene. The contacting of the reactants is carried out portionwise with stirring and at a temperature of from 0° to 100° C. During the reaction, the desired product sometimes precipitates in the reaction mixture as a crystalline solid. Upon completion of the reaction, the reaction mixture may be cooled to precipitate the desired product or to precipitate further product. The product may then be separated in conventional manner such as by filtration or decantation. If desired, the product may be purified by recrystallization from a suitable organic solvent.

The free esters of the present invention may be prepared by neutralizing the hydrochloride or hydrobromide salts as above prepared with caustic soda or other alkali metal hydroxide. The neutralization is carried out in an inert organic solvent and takes place readily at temperatures of from 20° to 50° C. Upon completion of the neutralization, the neutralized mixture may be washed with water and the solvent removed by evaporation to obtain the desired ester as a liquid.

Other mineral acid addition salts, such as the nitrate, sulfate and phosphate conveniently may be produced by reacting a free ester as above prepared with an equimolar amount of the corresponding mineral acid. The reaction conveniently is carried out in an inert organic solvent and takes place smoothly at temperatures of from 20° to 50° C. During the reaction, the desired salt product precipitates in the reaction mixture as a crystalline solid. The precipitated product may be separated as previously described and purified in conventional fashion.

The following examples are illustrative of the invention but are not to be construed as limiting:

*Example 1.—5-chloro-3-(dimethylaminomethyl)-2-biphenylyl acetate hydrochloride*

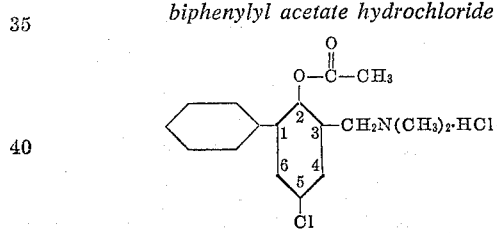

Acetayle chloride (15.7 grams, 0.2 mole) was added portionwise with stirring and cooling to 52.3 grams (0.2 mole) of 4-chloro-α-(dimethylamino)-6-phenyl-o-cresol dissolved in 250 milliliters of toluene. The addition was carried out over a period of 20 minutes and at a temperature of from 20° to 30° C. Toward the end of the addition, a crystalline solid precipitated in the reaction mixture. Following the addition, the stirring was continued for 40 minutes and the reaction vessel and contents thereafter cooled in an ice-water bath. The crystalline precipitate was separated by filtration to obtain a 5-chloro-3-(dimethylaminomethyl)-2-biphenylyl acetate hydrochloride product. This product was washed with cold toluene, dried and the dried product found to melt at 219°–221° C.

*Example 2.—5-chloro-3-(dimethylaminomethyl)-2-biphenylyl benzoate hydrochloride*

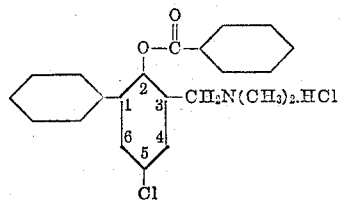

Benzoyl chloride (28.1 grams; 0.2 mole) was added portionwise with stirring and over a period of about 20 line solid precipitated in the reaction mixture and the minutes to 52.3 grams (0.2 mole) of 4-chloro-α-(dimethylamino)-6-phenyl-o-cresol dissolved in 150 milliliters of toluene. The temperature of the reaction mixture rose to from 15° to 45° C. with the addition of the benzoyl chloride. During the addition, a white crystalline mixture was diluted with 100 milliliters of toluene to facilitate mixing. Following the addition, stirring was continued for 30 minutes at a temperature of from 30° to 45° C. and the reaction vessel and contents thereafter cooled in an ice-water bath to below room temperature. During the cooling additional precipitate formed in the reaction mixture. The crystalline precipitate was then separated by filtration to obtain a 5-chloro-3-(dimethylaminomethyl)-2-biphenylyl benzoate hydrochloride product. This product was washed with cold toluene, dried and found to melt at 202°–204° C.

*Example 3.—5-chloro-3-(dimethylaminomethyl)-2-biphenylyl propionate hydrochloride*

Propionyl chloride (18.5 grams; 0.2 mole) was added portionwise with stirring and over a period of 10 minutes to 52.3 grams (0.2 mole) of 4-chloro-α-(dimethylamino)-6-phenyl-o-cresol dissolved in 150 milliliters of toluene. During the addition the temperature rose to from 15° C. to 52° C. Stirring was thereafter continued for 40 minutes and the reaction vessel and contents thereafter cooled in an ice-water bath. During the cooling a precipitate crystallized in the reaction mixture. The crystalline precipitate was separated by filtration to obtain a 5-chloro-3-(dimethylaminomethyl)-2-biphenylyl propionate hydrochloride product. This product was washed with cold toluene, dried and found to melt at 222°–224° C.

*Example 4.—5-chloro-3-(dimethylaminomethyl)-2-biphenylyl butyrate hydrochloride*

Butyryl chloride (21.3 grams; 0.2 mole) was added portionwise with stirring and over a period of 15 minutes to 52.3 grams (0.2 mole) of 4-chloro-α-(dimethylamino)-6-phenyl-o-cresol dissolved in 150 milliliters of toluene. The addition was accompanied by a temperature rise of from 20° C. to 53° C. and the precipitation of a crystalline solid in the reaction mixture. Following the addition, the reaction vessel and contents were cooled in an ice-water bath. During the cooling additional precipitate formed in the mixture. The crystalline solid was then separated by filtration to obtain a 5-chloro-3-(dimethylaminomethyl)-2-biphenylyl butyrate hydrochloride product. This product was washed with cold toluene, dried and found to melt at 216° C.

*Example 5.—5-chloro-3-(dimethylaminomethyl)-2-biphenylyl crotonate hydrochloride*

Crotonyl chloride (20.9 grams; 0.2 mole) was slowly added with stirring and over a period of 10 minutes to 52.3 grams (0.2 mole) of 4-chloro-α-(dimethylamino)-6-phenyl-o-cresol dissolved in 150 milliliters of toluene. The temperature rose to 55° C. during the addition and 300 milliliters of addition toluene was added to the reaction mixture to facilitate mixing. Following the addition, the reaction vessel and contents were cooled in an ice-water bath. During the cooling additional precipitate formed in the reaction mixture. The crystalline precipitate was then separated by filtration, washed with cold toluene and dried to obtain a 5-chloro-3-(dimethylaminomethyl)-2-biphenylyl crotonate hydrochloride product melting at 205°–207° C.

*Example 6.—3-(dimethylaminomethyl)-2-biphenylyl acetate hydrochloride*

Acetyl chloride (15.7 grams; 0.2 mole) was added portionwise with stirring to 45.4 grams (0.2 mole) of α-(dimethylamino)-6-phenyl-o-cresol dissolved in 250 milliliters of toluene. The addition was carried out over 10 minutes and at a temperature of from 22° C. to 50° C. During the addition, a crystalline solid precipitated in the reaction mixture. Stirring was thereafter continued for 40 minutes and the reaction vessel and contents thereafter cooled in an ice-water bath. The crystalline precipitate was separated by filtration, washed with cold toluene and dried to obtain a 3-(dimethylaminomethyl)-2-biphenylyl acetate hydrochloride product. This product was recrystallized from chlorobenzene and found to melt at 195°–198° C.

*Example 7.—3-(dimethylaminomethyl)-2-biphenylyl benzoate hydrochloride*

Benzoyl chloride (28.1 grams; 0.2 mole) was added portionwise with stirring to 45.4 grams (0.2 mole) of α-(dimethylamino)-6-phenyl-o-cresol dispersed in 250 milliliters of toluene. The addition was carried over about 20 minutes and at a temperature of from 20° C. to 45° C. The reaction mixture was then processed as described in Example 6 to obtain a 3-(dimethylaminomethyl)-2-biphenylyl acetate hydrochloride product. The latter product was recrystallized from ethyl alcohol and found to melt at 242°–243° C.

*Example 8.—5-chloro-3-(dimethylaminomethyl)-2-biphenylyl benzoate*

0.05 mole sodium hydroxide dispersed in 25 milliliters of water was added slowly portionwise to 0.05 mole of 5-chloro-3-(dimethylaminomethyl)-2-biphenylyl benzoate hydrochloride dispersed in 250 milliliters of acetone. The addition was carried out with stirring and cooling and over a period of 15 minutes. The acetone was then removed by vacuum distillation, the residue dissolved in 100 milliliters of benzene and the benzene solution washed with water. The benzene was then separated by fractional distillation under reduced pressure to obtain a 5-chloro-3-(dimethylaminomethyl)-2-biphenylyl benzoate product as an oily liquid residue. This product had a refractive index $n/D$ of 1.5925 at 25° C.

*Example 9*

In a similar manner 5-chloro-3-(dimethylaminomethyl)-2-biphenylyl butyrate hydrochloride was neutralized with sodium hydroxide to obtain a 5-chloro-3-(dimethylaminomethyl)-2-biphenylyl butyrate product having a refractive index $n/D$ of 1.5532 at 25° C.

*Example 10*

Neutralization of the product of Example 1 with sodium hydroxide in the previously described manner gave a 5-chloro-3-(dimethylaminomethyl)-2-biphenylyl acetate product having a molecular weight of 303.5.

*Example 11*

Nitric acid (0.2 mole) is slowly added portionwise over a period of 15 minutes to 0.2 mole of 5-chloro-3-(dimethylaminomethyl)-2-biphenylyl benzoate dispersed in 100 milliliters of benzene. The addition is carried out with stirring and cooling and at a temperature of from 20° to 30° C. During the addition a crystalline solid precipitates in the reaction mixture. This product is separated by filtration and washed with water to obtain a 5-chloro-3-(dimethylaminomethyl)-2-biphenylyl benzoate nitrate salt product. 5-chloro-3-(dimethylaminomethyl)-2-biphenylyl benzoate nitrate has a molecular weight of 428.5.

In a similar manner other compounds of the present invention may be prepared of which the following are representative.

5-chloro-3-(dibutylaminomethyl)-2-biphenylyl acetate hydrobromide by reacting 4-chloro-α-(dibutylamino)-6-phenyl-o-cresol with acetyl bromide.

3-(diethylaminomethyl)-2-biphenylyl benzoate hydrobromide by reacting α-(diethylamino)-6-phenyl-o-cresol with benzoyl bromide.

3-(dimethylaminomethyl)-2-biphenylyl benzoate by neutralizing 3-(dimethylaminomethyl)-2-biphenylyl benzoate hydrochloride with potassium hydroxide.

5-chloro-3-(N-methyl-N - ethylaminomethyl) - 2 - biphenylyl butyrate hydrochloride by reacting 4-chloro-α-(N-methyl-N-ethylamino)-6-phenyl-o-cresol with butyryl chloride.

5-chloro-3-(diethylaminomethyl)-2-biphenylyl acrylate hydrochloride by reacting 4-chloro-α-(diethylamino)-6-phenyl-o-cresol with acryloyl chloride.

3-(dimethylaminomethyl)-2-biphenylyl pentenoate hydrochloride by reacting α-(dimethylamino)-6-phenyl-o-cresol with pentenoyl chloride.

The new esters have been tested and found effective as herbicides. i. e. for the killing weeds. For such use the products may be dispersed on an inert finely divided solid and employed as dusts. Also, such mixtures may be dispersed in water with the aid of a wetting agent, and the resulting aqueous suspensions employed as sprays. In other procedures, the products may be employed as constituents of oil-in-water emulsions, or water dispersions with or without the addition of wetting, dispersing or emulsifying agents. In representative operations substantially complete controls of the growth of the seeds and emerging seedlings of crabgrass were obtained when 5-chloro-3-(dimethylaminomethyl)-2-biphenylyl butyrate hydrochloride was dispersed in soil at a dosage of 5 pounds per acre.

The α-(dialkylamino)-6-phenyl-o-cresol compounds employed as starting materials in accordance with the present invention may be prepared by reacting together an appropriately substituted phenol, formaldehyde and a suitable dialkylamine. In a convenient method of carrying out the reaction, one molecular proportion of formaldehyde is added to a mixture comprising one molecular proportion of each of the phenol and amine reactants in a solvent such as ethanol. The reaction takes place readily at temperatures above 20° C. with the production of the desired product and water of reaction. Upon completion of the reaction, the reaction mixture may be cooled and filtered to separate the desired cresol product as a crystalline solid.

I claim:

1. A compound selected from the group consisting of (A) esters having the formula

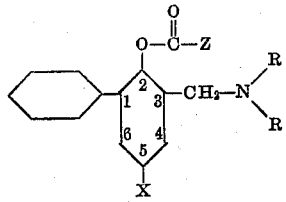

wherein each R represents lower alkyl, Z represents a member of the group lower alkyl, lower alkenyl and phenyl, and X represents a member of the group hydrogen and chlorine, and (B) the mineral acid addition salts of said ester compounds.

2. 5-chloro-3-(dimethylaminomethyl) - 2 - biphenylyl acetate.

3. 5-chloro-3-(dimethylaminomethyl) - 2 - biphenylyl benzoate hydrochloride.

4. 5-chloro-3-(dimethylaminomethyl) - 2 - biphenylyl propionate hydrochloride.

5. 5-chloro-3-(dimethylaminomethyl) - 2 - biphenylyl crotonate hydrochloride.

6. 3-(dimethylaminomethyl)-2-biphenylyl acetate hydrochloride.

References Cited in the file of this patent

UNITED STATES PATENTS

| | | |
|---|---|---|
| 2,141,172 | Christiansen et al. | Dec. 27, 1938 |
| 2,260,967 | Bruson | Oct. 28, 1941 |

UNITED STATES PATENT OFFICE

CERTIFICATE OF CORRECTION

Patent No. 2,872,477　　　　　　　　　　　　　　　　February 3, 1959

Raymond H. Rigterink

It is hereby certified that error appears in the printed specification of the above numbered patent requiring correction and that the said Letters Patent should read as corrected below.

Column 1, line 38, for "kiling" read -- killing --; column 2, line 45, for "Acetayle" read -- Acetyl --; column 3, line 1, strike out "line solid precipitated in the reaction mixture and the" and insert the same after "crystal-" in line 6, same column; column 4, line 30, for "hydrochyloride" read -- hydrochloride --.

Signed and sealed this 22nd day of September 1959.

(SEAL)
Attest:

KARL H. AXLINE　　　　　　　　　　　　　　　　　　ROBERT C. WATSON
Attesting Officer　　　　　　　　　　　　　　　　　Commissioner of Patents